US006539160B2

United States Patent
Battey et al.

(10) Patent No.: US 6,539,160 B2
(45) Date of Patent: Mar. 25, 2003

(54) OPTICAL FIBER SPLICING AND CONNECTING ASSEMBLY WITH COUPLER CASSETTE

(75) Inventors: Jennifer A. Battey, Euless, TX (US); Steve A. Fontaine, Ft. Worth, TX (US); James M. Carlson, Ft. Worth, TX (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/748,916

(22) Filed: Dec. 27, 2000

(65) Prior Publication Data

US 2002/0051616 A1 May 2, 2002

Related U.S. Application Data

(63) Continuation-in-part of application No. 09/698,924, filed on Oct. 27, 2000.

(51) Int. Cl.[7] .................................................. G02B 6/00
(52) U.S. Cl. ....................................................... 385/135
(58) Field of Search .................................... 385/134–7

(56) References Cited

U.S. PATENT DOCUMENTS

| 5,323,480 A | | 6/1994 | Mullaney et al. ............ 385/135 |
| 5,602,954 A | | 2/1997 | Nolf et al. ................... 385/135 |
| 5,631,993 A | * | 5/1997 | Cloud et al. ................. 385/135 |
| 5,734,776 A | * | 3/1998 | Puetz ........................... 385/134 |
| 5,758,004 A | * | 5/1998 | Alarcon et al. .............. 385/135 |
| 5,768,463 A | * | 6/1998 | Foss et al. ................... 206/557 |
| 5,796,908 A | * | 8/1998 | Vicory ......................... 385/135 |
| 5,825,964 A | * | 10/1998 | Goetter et al. .............. 385/135 |
| 6,275,639 B1 | * | 8/2001 | Bolt et al. ................... 385/134 |
| 6,292,614 B1 | * | 9/2001 | Smith et al. ................. 385/135 |
| 6,304,707 B1 | * | 10/2001 | Daems et al. ............... 385/134 |

* cited by examiner

Primary Examiner—Lynn Field
Assistant Examiner—Brian S. Webb
(74) Attorney, Agent, or Firm—Christopher C. Dremann

(57) ABSTRACT

A fiber optic closure includes a panel assembly having at least two panels hinged to one another. The panel assembly includes a storage bay sandwiched between a pair of fiber management and connection assemblies. Each fiber management and connection assembly includes a sleeve connector panel that supports at least one sleeve connector array for establishing optical fiber connections. The splice panel having splice tube holders is also provided for establishing splices. The splice panel may further have at least one coupler cassette for splitting at least one input optical fiber into two or more output optical fibers. Preferably, the splice panel is positioned adjacent the sleeve connector panel so that a craftsperson can easily form custom sleeve connections within the fiber optic closure utilizing the splice panel to splice connectors onto selected optical fibers and utilizing the sleeve connector panel to interconnecting the connectors with opposing connectors.

15 Claims, 6 Drawing Sheets

OPTICAL FIBER SPLICING AND CONNECTING ASSEMBLY WITH COUPLER CASSETTE

CROSS REFERENCE TO RELATED APPLICATION

This application is a continuation-in-part of U.S. patent application Ser. No. 09/698,924 filed on Oct. 27, 2000.

FIELD OF THE INVENTION

The present invention relates generally to closures for optical fiber splices and connections. More specifically, the invention relates to panel assemblies for use within such closures that include at least one coupler cassette. In another aspect, the invention relates to a fiber optic closure for splitting optical fibers and effecting splice-type and sleeve-type optical fiber connections, and for managing the optical fibers and connections associated therewith.

BACKGROUND OF THE INVENTION

Closures are used to protect connection s made between the optical fibers of fiber optic cables. Closures are often aerially located along a telephone drop line and allow connections between the telephone company's main service line and drop lines, which provide phone service to one or more subscribers. Fiber optic closures are used to house the connections made to interconnect the optical fibers of the service line to the optical fibers of the drop lines.

Conventional fiber optic closures are constructed to facilitate the management and protection of fiber-to-fiber splices. For example, many closure designs incorporate splice trays to assist a craftsperson in forming a splice connection between two optical fibers. Once all such splices are made, the outer housing of the closure is secured around the splice trays to protect the splices from weather, infestations, animals and other hazards.

One problem with conventional fiber optic closures is that they are designed to primarily, if not exclusively, house splices to the exception of other types of connections that might be made between optical fibers. With conventional splice-type closures, a pair of fiber optic cables, which contain several individual optical fibers, cannot be readily connected to one another. A craftsperson must strip the insulation cover off of each of the cables and then perform a splice for each pair of individual optical fibers to be joined. Thus, a significant advantage would be obtained by providing a fiber optic closure that is useful for forming and protecting non-splice-type connections as well as splice-type connections. Specifically, it would be advantageous to provide a fiber optic closure that allows sleeve-type connections to be made and protected in addition to splice-type connections.

Conventional closures also lack the capability to split a single optical fiber into two or more optical fibers. It is becoming increasingly necessary in fiber optic networks for a feeder, or express, cable to be connected with multiple drop cables so that service may be supplied to several customers simultaneously. Thus, it would be particularly advantageous to further provide a closure with the capability to split a single optical fiber into two or more optical fibers.

A related problem with current fiber optic closures is that of management of the fiber optic cables and optical fibers. In actual use, a closure contains a great many fiber optic cables and individual optical fibers that are densely packed together. Efforts have been made to provide a means for organizing these fibers and cables. For instance, splice closures are known that incorporate multiple panels to assist in the layout of the individual optical fibers. (See U.S. Pat. No. 5,323,480 entitled "Fiber Optic Splice Closure," and U.S. Pat. No. 5,602,954 entitled "Electrofit Fiber Optics Butt Splice.") Currently, however, there is no acceptable system for orderly management of optical fiber splice-type connections as well as optical fiber sleeve-type connections. The fiber management problem extends to, and is obviously exacerbated, in closures wherein a single optical fiber is split into two or more optical fibers. As previously noted, such closures are commonly required when an express cable services multiple drop cables for distribution to several individual businesses or dwellings simultaneously.

SUMMARY OF THE INVENTION

The invention provides a fiber optic closure for overcoming the disadvantages of the prior art. In a preferred embodiment, a fiber optic closure is shown and described that has a panel assembly with several planar panels affixed to one another in a hinged manner. The panel management assembly further includes a storage bay that is sandwiched between a pair of optical fiber connection management assemblies.

Each optical fiber connection management assembly includes a panel that supports one or more sleeve connector arrays within which sleeve connectors may be inserted to create fiber optic connections. The panel assembly also provides a conventional splice panel having splice holders within which splice connections are established.

It is preferred to position the splice panel directly adjoining the sleeve connector panel since this will allow a craftsperson to easily form custom sleeve connections within the closure by splicing connectors onto selected optical fibers using the splice panel and then interconnecting the connectors with other connectors using the sleeve connector panel.

A further exemplary splice closure is described and shown that incorporates at least one coupler cassette within the optical fiber connection management assembly. Each coupler cassette is utilized to split a single optical fiber into two or more optical fibers. The coupler cassettes may be conveniently installed and removed from the closure. Accordingly, the coupler cassettes provide an effective means for splitting preselected input optical fibers into predetermined number of output optical fibers to be connected by a field craftsman at the time of installation, or at a later time, to multiple drop cables. The coupler cassettes are generally rectangular enclosures with removable covers that house conventional splitter components and splice tube holder therein.

DETAILED DESCRIPTION OF THE INVENTION

Figure 1:
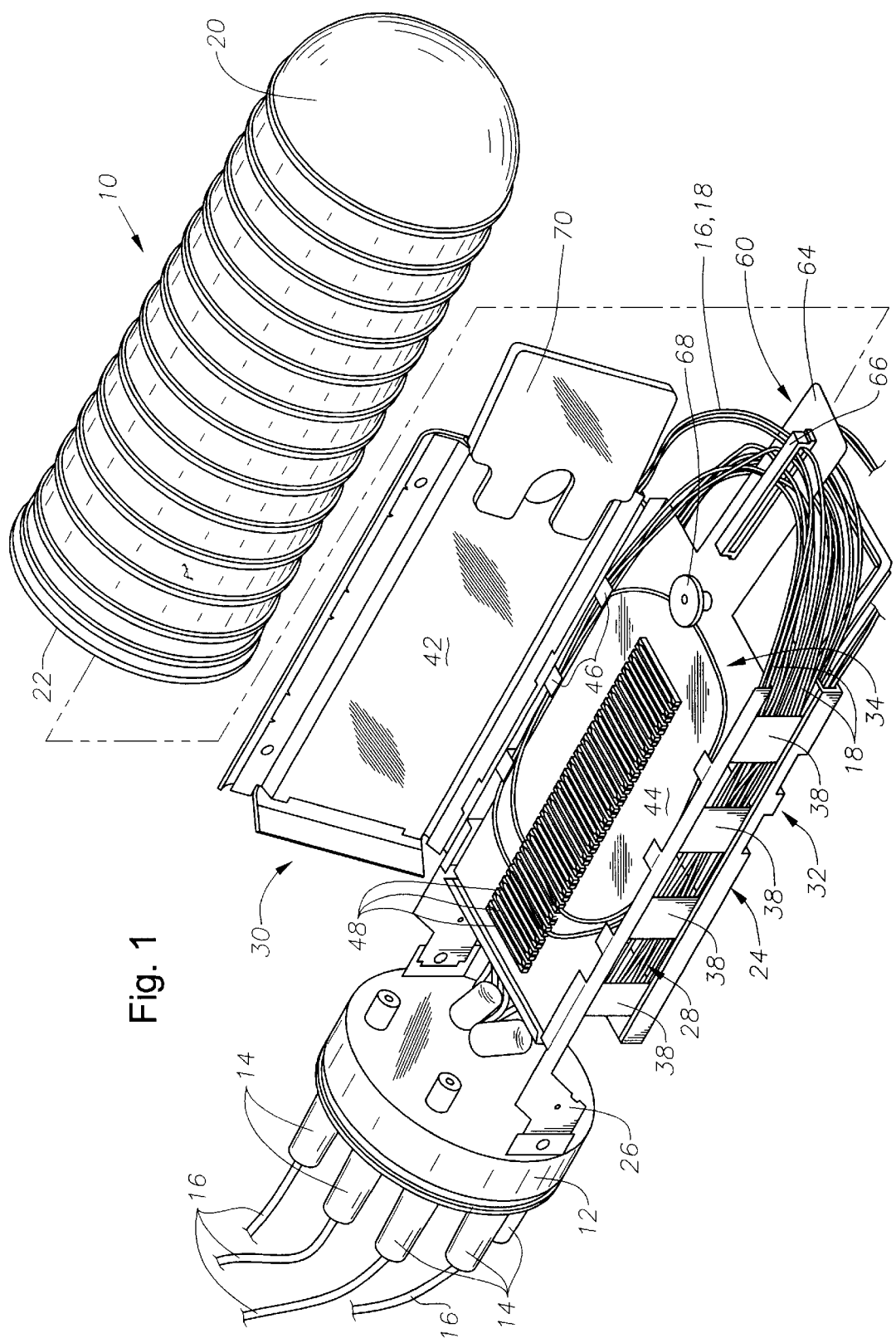
FIG. 1 is a partially exploded perspective view of an exemplary fiber optic closure constructed in accordance with the present invention in which the closure is shown opened to provide access to a butt splice panel.

FIGS. 1 through 4 depict an exemplary fiber optic closure 10 for use in making connections between a plurality of optical fibers and/or fiber optic cables. The closure 10 has a short cylindrical base 12 with a plurality of sleeves 14 for receiving fiber optic cables 16. It is noted that each of the fiber optic cables 16 contains a bundle of individual optical fibers 18 that are encased within an insulating sheath. In the figures, the sheath is shown stripped away from the individual optical fibers 18 after the fiber optic cables 16 are passed through the base 12. There are typically two individual optical fibers 18 within each fiber optic cable 16, although there may be more than two fibers bundled together by the outer sheath. Also, while the invention is described herein with reference to an exemplary embodiment that provides for storage, connection, and management of optical fibers 18 and fiber optic cables 16, it will be understood and appreciated by those of skill in the art that the invention is not limited in this regard and is applicable as well to, for example, fiber optic ribbon.

A dome-shaped outer housing 20 is removably securable to the base 12. The housing 20 is hollow and defines an opening 22 that is shaped and sized to fit over and engage the base 12 in a conventional manner. When engaged, the housing 20 provides protection for the internal components of the closure 10 from weather, infestations, animals and other external hazards.

A panel assembly, indicated generally at 24, is affixed to the base 12 by a mounting bracket 26. The panel assembly 24, as illustrated in the exemplary embodiment shown and described herein, includes an optical fiber and/or fiber optic cable storage bay 28 that is sandwiched between two connection management assemblies 30, 32. The connection management assemblies 30 and 32 are essentially identical to one another in construction and operation. Each of the connection management assemblies 30, 32 is hinged, and thereby adapted to be rotated away from the area of the storage bay 28 to expose the fiber optic cable 16 and/or optical fibers 18 stored within the storage bay 28. Although FIGS. 1 through 4 illustrate the hinged connections as being located at a lateral side of the panel assembly 24, the connections might also be located proximate the base 12.

Figure 3:
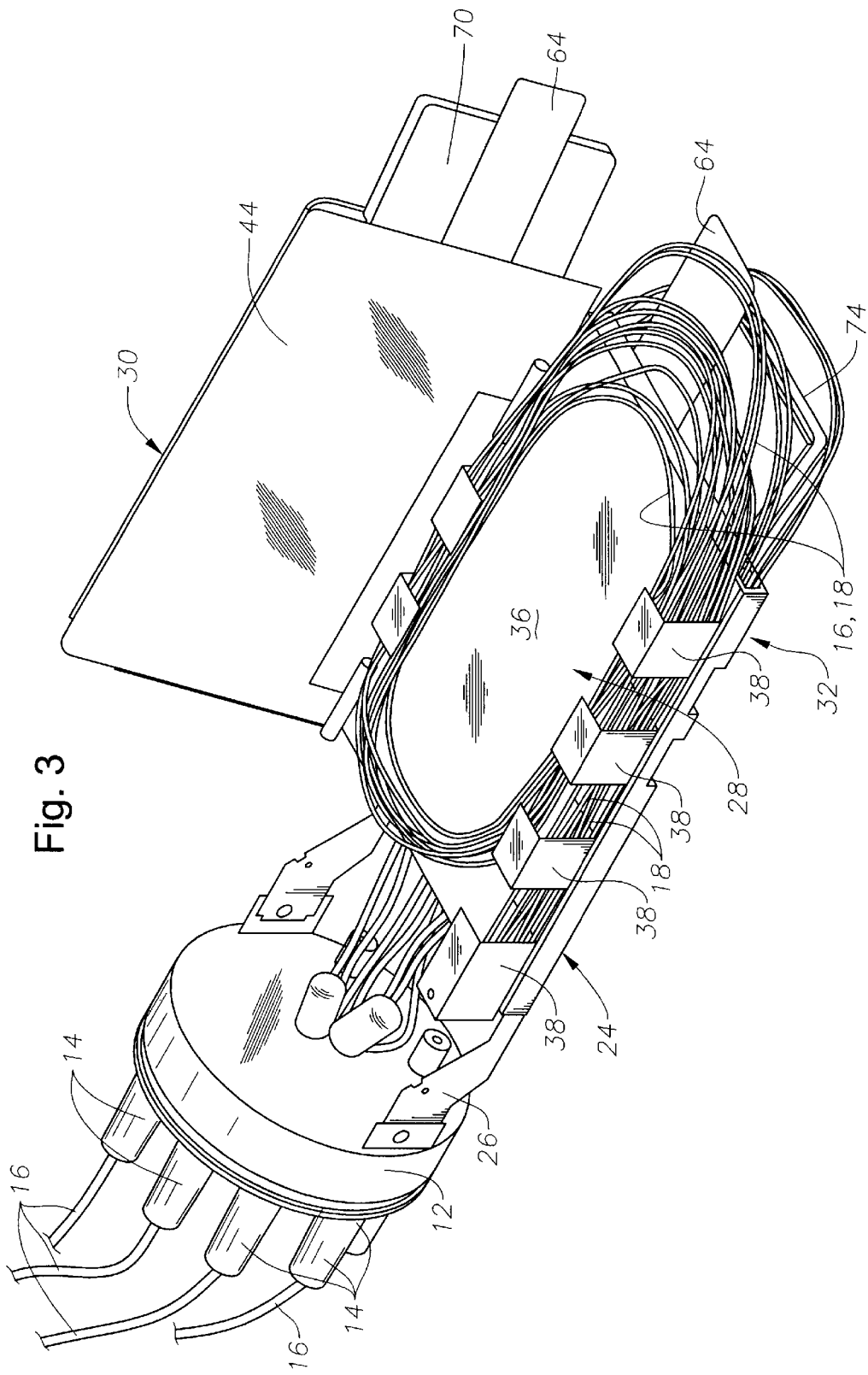
FIG. 3 is a perspective view of the fiber optic closure of FIG. 1 in which a portion of the closure is shown turned upside down and opened to provide access to a slack storage panel.

The storage bay 28, as best shown in FIG. 3, is an area within which lengths of slack fiber optic cables 16 and slack optical fibers 18 may be coiled and stored. The storage bay 28 is disposed between and bounded by upper and lower longitudinal splice panels 34 and 36 (FIG. 4), the construction and operation of which will be described shortly. Brackets 38 are laterally disposed on either side of the storage bay 28 to provide sufficient depth to the storage bay 28. The upper and lower panels 34, 36 are hingedly affixed to the brackets 38. As those of skill in the art will readily understand and appreciate, it is important that the storage bay 28 provide adequate width and length to allow the fiber optic cables 16 and optical fibers 18 to be coiled within the storage bay 28 without exceeding the minimum bend radius, and thereby damaging the fiber optic cable 16 or optical fiber 18. The lengths of slack fiber optic cables 16 and optical fibers 18 are wound about the perimeter of storage bay 28.

It is preferred that the brackets 38 retain the lengths of slack fiber optic cables 16 and optical fibers 18.

In addition to defining the storage bay 28, the upper and lower splice panels 34, 36 also form portions of the upper and lower fiber connection management assemblies 30, 32, respectively. With reference to the figures, the structure and operation of the upper connection management assembly 30 will be described. Upper connection management assembly 30 includes three panels that are disposed in a parallel relation to one another and are hinged to move angularly relative to one another. The three panels are outer cover panel 40 (FIG. 2), sleeve connector panel 42 (FIG. 2), and splice panel 34 (FIG. 1).

It is noted that, while the hinged design is presently preferred and depicted, the invention is not limited to only a hinged design. The panels 40, 42, 34 and so forth might also be stacked upon one another and snapped together. For example, the outer cover would snap onto the sleeve connector panel and the sleeve connector then would snap onto the splice panel. Thus, the outer cover and the sleeve connector panel would be filly removable to expose the desired panel.

The splice panel 34 includes a generally flat, generally rectangular platform 44 that has several cable retaining clips 46 located on each of its lateral sides. Centrally disposed upon the platform 44 is a series of splice holders 48 of a type well known in the art. Although a typical butt splice is illustrated, it will be readily understood and appreciated by those of skill in the art that splice panel 34 may support other types of splices as well, such as fusion splices and mechanical splices.

Figure 2:
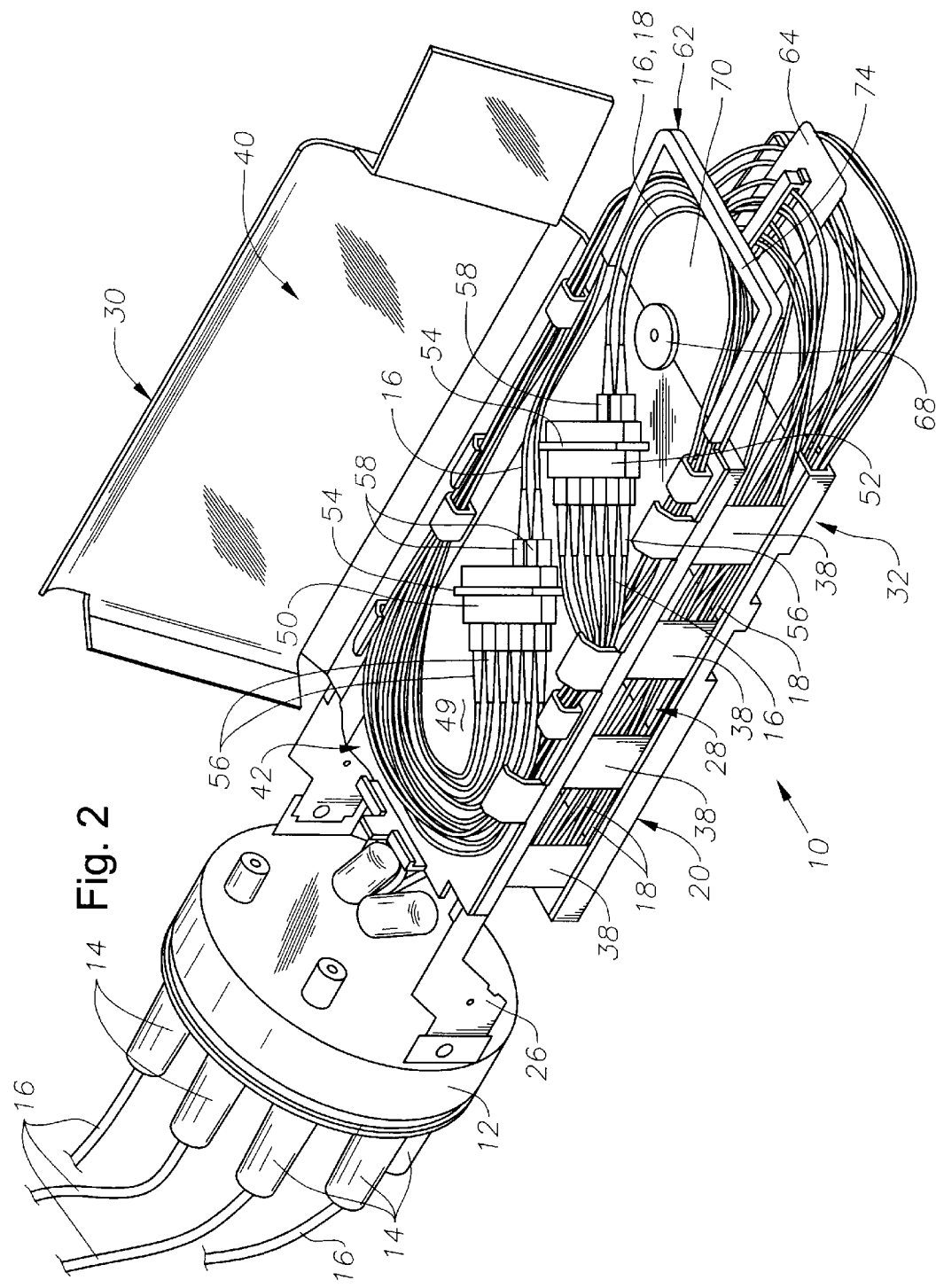
FIG. 2 is a perspective view of the fiber optic closure of FIG. 1 in which a portion of the closure is shown opened to provide access to a sleeve connector panel.

FIG. 2 clearly depicts the sleeve connector panel 42. Sleeve connector panel 42 includes a generally flat, generally rectangular platform 49 with a pair of sleeve connector arrays 50, 52 mounted thereupon by retaining clips 54. The sleeve connector arrays 50, 52 each provide a series of aligned receptacles capable of receiving fiber optic cable connectors in an opposing relation to establish an optical connection.

It is noted that the sleeve connector arrays 50, 52 are affixed to the platform 49 at an angle from the longitudinal axis of the panel 42. FIG. 2 shows a particularly preferred angle of about 45 degrees that allows for easy insertion of opposing connectors 56, 58. As can be seen in FIG. 2, there are opposing connectors 56, 58 disposed in each of the arrays 50, 52 on either side of each array. However, the angle of the arrays 50, 52 relative to the longitudinal axis of the platform 49 ensures that the connectors 56, 58 and fiber optic cables 16 affixed thereto do not interfere with or block one another making insertion of the connectors 56, 58 difficult or impossible.

As will be appreciated by reference to FIG. 2, the connectors 56 are of a different type than the connectors 58. In the depicted embodiment, the connectors 56 are MT-RJ connectors, while the connectors 58 on the opposing sides of the arrays 50, 52 are conventional SC connectors. Although the invention does not require that distinct types of connectors be used on opposing sides of the arrays 50, 52, it will be readily understood and appreciated that the invention provides such flexibility.

The cable management assemblies 30, 32 also feature routing guides 60, 62 that assist with the management of fiber optic cables 16 and optical fibers 18. A first type of routing guide 60 is illustrated in FIG. 1 and consists of a narrow plate 64 having a routing clip 66 mounted thereupon within which loops of slack fiber optic cable 16 and/or slack optical fibers 18 are retained. The routing clip 66 helps protect the fiber optic cables 16 and/or optical fibers 18 from becoming crushed. The plate 64 is integrally formed with the platform 44, but may also be secured in any conventional manner, such as by riveting or welding. As depicted in FIGS. 1 and 2, an additional fiber routing guide 68 may also be affixed to the base of the routing guide 60 in a conventional manner.

An alternative type of routing guide 62 is depicted in FIG. 2. This type of routing guide provides a broader plate 70 that is secured to the platform 49, for example, by riveting or spot welding. Rather than a routing clip, however, the plate 70 incorporates a peripheral channel 74 within which portions of slack fiber optic cable 16 and/or slack optical fibers 18 are disposed for storage. The channel 74 also protects the fiber optic cables 16 and/or optical fibers 18 against crushing.

Figure 4:
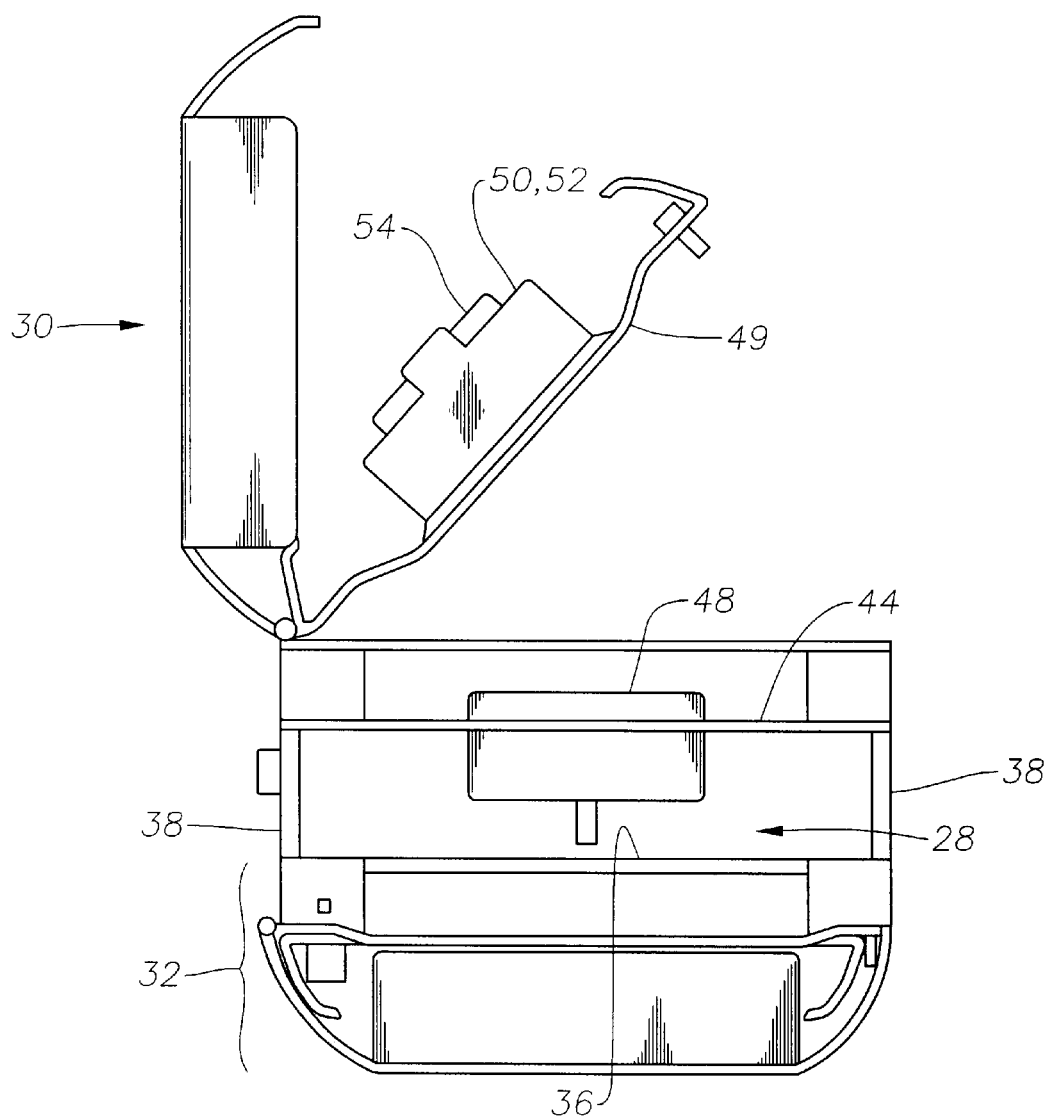
FIG. 4 is an end view of the fiber optic closure of FIG. 1 shown with the outer housing removed.

It is noted that the positioning of the splice holders 48 on a splice panel 34 that is hinged to and located adjacent a platform 49 carrying the sleeve connector arrays 50, 52 (as illustrated in FIG. 4) is particularly advantageous as it permits a craftsperson to establish and locate custom fiber connections proximate to the sleeve connector panel 42. The craftsperson may select a set of optical fibers 18 and, using the splice holders 48, connect a jack, such as an MT-RJ connector or a SC connector to the selected optical fibers 18. The splice connection for each particular pair of connectors and set of optical fibers 18 may be easily located since it will be located in the splice holders 48 on the adjacent splice panel 34. In operation, the fiber optic cables 16 and individual optical fibers 18 are routed from the storage bay 28 to the splice panel 34 and from the splice panel 34 to the sleeve connector panel 42 through the routing clip 66.

Figure 5:
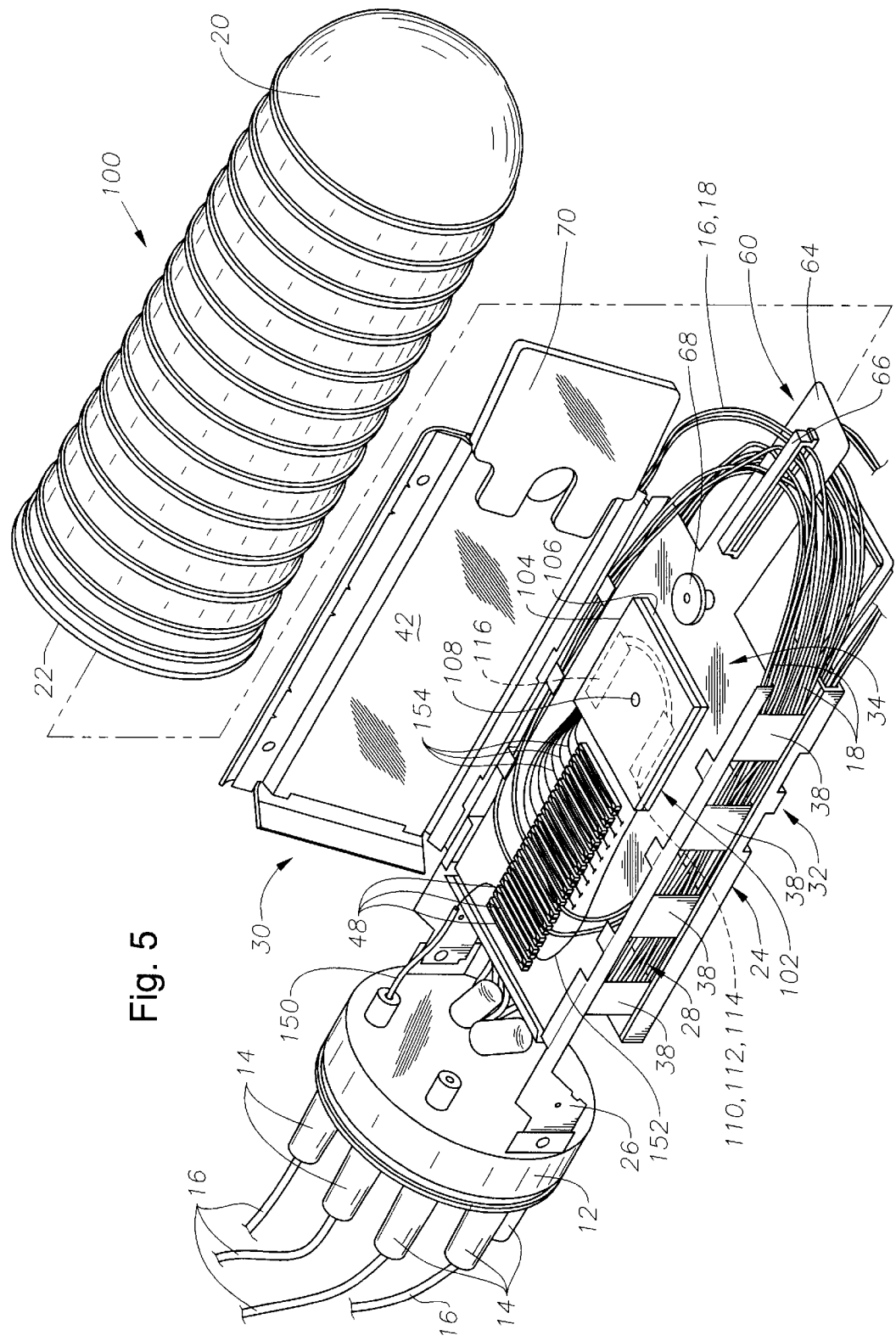
FIG. 5 is a perspective view of another exemplary closure constructed in accordance with the present invention including a pair of coupler cassettes.

Referring now to FIG. 5, there is shown an embodiment of a splice closure 100 wherein a coupler cassette subassembly 102 is affixed to the splice panel 34. For simplicity, like references numerals are used for like components between the splice closure 10 described earlier and the splice closure 100. The splice panel 34 may further include a plurality of splice tube holders 48, as previously described. As shown, the splice panel 34 comprises a plurality of splice tube holders 48 and a coupler cassette subassembly 102 that includes at least two coupler cassettes mounted to the tray in a stacked configuration. In the embodiment depicted in FIG. 5, there are two coupler cassettes 104 and 106.

The cassettes 104, 106 are containers that are generally rectangular in shape and sized to fit on the splice panel 34. Each cassette 104, 106 has a removable cover and is secured to the panel 34 by a retaining post (not shown) that is disposed through apertures 108 in the center of the cassettes 104, 106. Each of the coupler cassettes 104, 106 is capable of receiving a single input fiber and splitting it into two or more output optical fibers.

Figure 6:
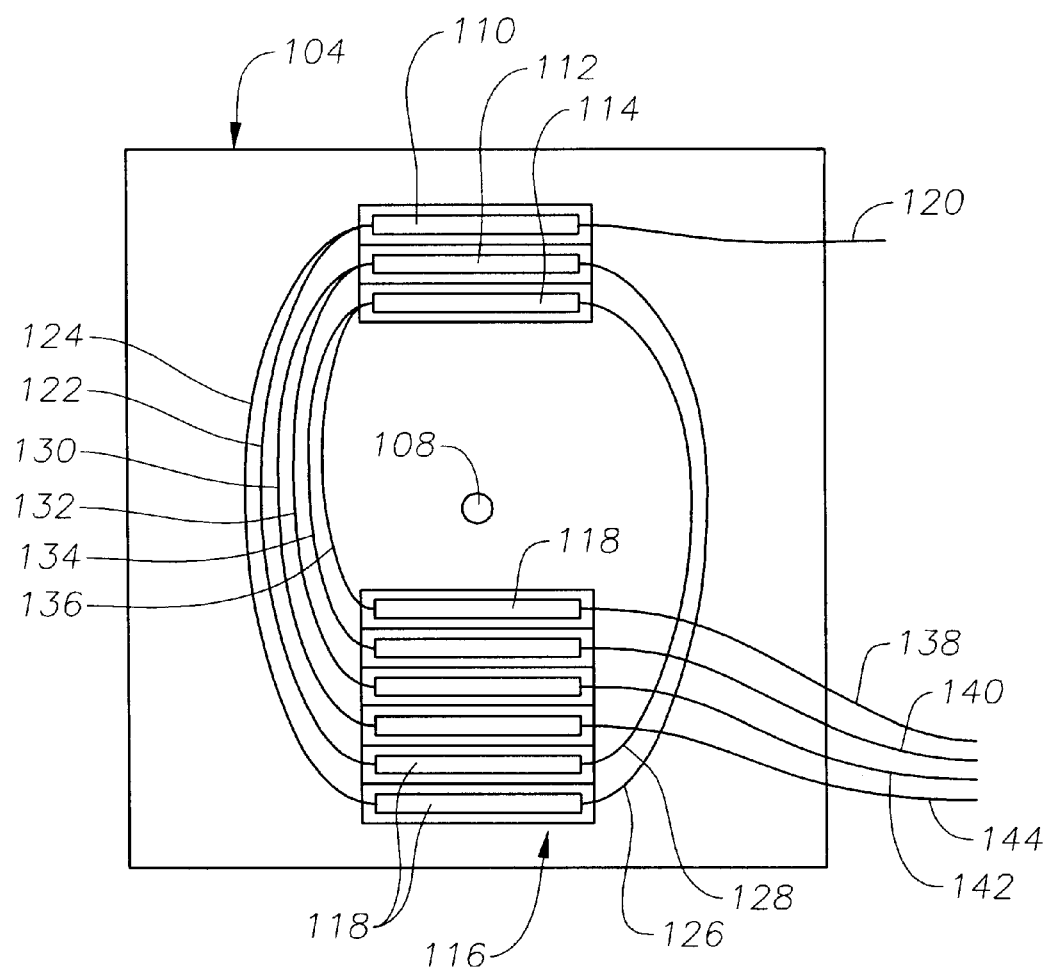
FIG. 6 is a schematic illustrating the layout of the coupler cassettes of FIG. 5.

FIG. 6 illustrates the layout of the optical fibers and splitter components within the coupler cassette 104. There are three splitter components 110, 112 and 114, each of which receives a single input optical fiber at one end and provides two or more output optical fibers at the other end. The splitter components 110, 112 and 114 are commercially available components that have pigtails at either end to which optical fibers may be affixed to permit uninterrupted light transmission therethrough. On the opposite side of the enclosure of the coupler cassette 104 is a splice organizer 116 that includes six splice tube holders 118, in the present example. FIG. 6 illustrates a single input optical fiber 120 that enters the coupler cassette 104 and is optically connected with splitter component 110 to produce a pair of output fibers 122 and 124. The output fibers 122, 124 are then spliced within two splice tube holders 118 to connecting fibers 126, 128, respectively. The connecting fibers 126, 128 are routed to the splitter components 112, 114 so that each connecting fiber 126, 128 is split again into output fibers 130, 132, 134 and 136. Output fibers 130, 132, 134, and 136 are in turn spliced in splice tube holders 118 to output optical fibers 138, 140, 142 and 144. The output optical fibers 138, 140, 142 and 144 are routed from the coupler cassette 104 to, for example, sleeve connector panel 42. It is noted that the presence of splice tube holders 118 within the enclosure of the coupler cassette 104 is advantageous since they ensure that the connecting fibers are routed back to the splitter components 112 and 114 safely and without permitting the optical fibers to be bent beyond the minimum bend radius, which may damage the fibers.

The coupler cassette 106 contains splitter components and a splice organizer in the same manner as described above with respect to coupler cassette 104. The coupler cassette 106 may be used to divide a second express cable for connection to multiple drop cables. Alternatively, one of the output optical fibers 138, 140, 142, or 144 from coupler cassette 104 may enter the coupler cassette 106 and be split further, for example, into four additional output optical fibers. There may, of course, be changes in the number of splitter components present in either of the cassettes 104, 106 from that described here. Also, there may be only one or more than two coupler cassettes.

The presence of the splice tube holders 48 below the coupler cassette assembly 102 is useful and advantageous. Output optical fibers (e.g., 138, 140, 142, 144) departing the coupler cassettes 104, 106 may be disposed in the splice tube holders 48 for organization and connection by a craftsperson working in the field. At the same time, the cassettes 104, 106 may be secured with their covers in place so that the connections that have been made therein are not inadvertently disturbed or broken. The cassettes 104, 106 may also be easily installed and removed from the closure 100. This allows a closure to be readily retrofitted with a predetermined number of output optical fibers so that craftsperson in the field need only connect the output fibers that are conveniently arranged and positioned in the splice tube holders 48.

In one exemplary mode of operation, illustrated in FIG. 5, the closure 100 is used to split an optical fiber of an express cable into a predetermined number of output optical fibers for connection to multiple drop cables. An express cable 150 enters the base 12 of the closure 100 and a single input optical fiber 152 from that express cable 150 is spliced onto an optical fiber from the splice tube holder 48, the splice is retained therein, and the input optical fiber 152 is then routed into the coupler cassette assembly 102. The input optical fiber 152 is then split by the coupler cassettes 104 and 106 into multiple output optical fibers 154. The output optical fibers 154 are then routed to splice tube holders 48 where they are spliced onto optical fibers (not shown) leading to, for example, sleeve connector arrays 50, 52 provided on the sleeve connector panel 42 for connection to optical fibers from the multiple drop cables.

The fiber optic closure of the present invention provides a number of advantages. First, a workable fiber management system is provided that allows organized storage of different types of fiber connections including, specifically, splice-type connections and sleeve-type connections. The presence of the sleeve connector arrays 50, 52 within a more conventional fiber optic closure allows convenient interconnection of fiber optic cables that have sleeve connectors on their ends. Also, sleeve-type connections are more easily reversed than splice-type connections. Thus, the sleeve connector panel allows fiber optic cable connections to be easily disconnected when necessary, such as when it is desired to temporarily disconnect subscriber service. The fiber optic closure of the present invention may also include at least one coupler cassette. The coupler cassette provides the capability to split a single input optical fiber into two or more output optical fibers for connection to, for example, multiple drop cables.

It is noted that the construction of the internal components of the fiber optic closure shown and described herein is exemplary only. Those skilled in the art will recognize that numerous modifications to the structure, organization, and configuration of the closure may be made while remaining within the intended scope of the claims.

That which is claimed is:

1. A fiber optic closure comprising:
    a first panel mounted within the closure and configured for holding sleeve-type connections between optical fibers, the first panel having at least one sleeve connector array mounted thereon for receiving opposing fiber optic connectors therein to establish an optical connection between optical fibers, the first panel defining a plane and a longitudinal axis parallel to the plane and the sleeve connector array mounted on the first panel with the fiber optic connectors parallel to the plane;
    a second panel mounted within the closure adjacent the first panel, the second panel having at least one coupler cassette mounted thereon for splitting a signal from an input optical fiber into a plurality of output optical fibers, the second panel defining a plane that is parallel to the plane defined by the first panel a storage bay mounted within the closure for retaining a length of slack fiber optic cable therein, the storage bay defining a plane that is parallel to the plane defined by the first panel.

2. The closure of claim 1 wherein the second panel comprises at least one splice tube holder mounted thereon for receiving opposing optical fibers therein to establish an optical connection between the optical fibers.

3. The closure of claim 1 further comprising a routing guide that is affixed to an end of the second panel for routing optical fiber between the storage bay and the second panel and between the second panel and the first panel.

4. The closure of claim 1 further comprising a base to which the first panel and the second panel are secured and a cover that is shaped and sized to be removably affixed to the base and wherein the second panel is mounted inwardly of the first panel and the fist panel is movable relative to the second panel to provide access to the optical fibers.

5. A panel assembly for use within a fiber optic closure, the panel assembly adapted to manage fiber optic cable and optical fiber connections, the panel assembly comprising:
    a first mounting platform having at least one sleeve connector array mounted thereon for receiving at least a pair of opposed fiber optic connectors, the first mounting platform defining a plane and a longitudinal axis parallel to the plane and the sleeve connector array mounted on the first mounting platform with the fiber optic connectors parallel to the plane;
    a second mounting platform having at least one coupler cassette mounted thereon for splitting a signal from an input optical fiber into a plurality of output optical fibers, the second mounting platform defining a plane that is parallel to the plane defined by the first mounting platform and a storage bay mounted for retaining a length of slack fiber optic cable therein, the storage bay defining a plane that is parallel to the plane defined by the first mounting platform.

6. The panel assembly of claim 5 wherein the second mounting platform further comprises at least one splice tube holder mounted thereon, the splice tube holder receiving opposing optical fibers therein to establish an optical connection between the optical fibers.

7. The panel assembly of claim 5 wherein the fiber optic connectors are mounted in the sleeve connector array at an angle of about 45 degrees relative to the longitudinal axis of the first mounting platform a storage bay mounted for retaining a length of slack fiber optic cable therein, the storage bay defining a plane that is parallel to the plane defined by the first mounting platform.

8. The panel assembly of claim 5 wherein the sleeve connector array comprises a retainer shaped and sized to receive the pair of opposed fiber optic connectors.

9. A fiber management assembly for use within a fiber optic closure, the fiber management assembly comprising:
    at least one sleeve connector array, the sleeve connector array configured to receive at least a pair of opposed fiber optic connectors therein to establish an optical connection between optical fibers;
    at least one coupler cassette operatively associated with the sleeve connector array, the coupler cassette configured to split a signal from an input optical fiber into a plurality of output optical fibers; and
    a storage bay operatively associated with at least one of the sleeve connector array and the coupler cassette for retaining and organizing at least one length of slack fiber optic cable, the storage bay defining a plane and a longitudinal axis parallel to the plane, the fiber optic connectors received in the sleeve connector array with the fiber optic connectors parallel to the plane defined by the storage bay and the coupler cassette defining plane that is parallel to the plane defined by the storage bay.

10. The fiber management assembly of claim 9 further comprising at least one splice tube holder for receiving opposing optical fibers therein to establish an optical connection between the optical fibers.

11. The fiber management assembly of claim 9 wherein the sleeve connector array is mounted on a first panel and the coupler cassette is mounted on a second panel, the first panel and the second panel being hingedly affixed to one another and wherein the second panel is mounted inwardly of the first panel and the first panel is movable relative to the second panel to provide access to the optical fibers.

12. The fiber management assembly of claim 9 comprising:
    a first fiber management and connection panel assembly comprising at least one sleeve connector array and at least one coupler cassette; and
    a second fiber management and connection panel assembly comprising at least one sleeve connector array and at least one coupler cassette;
    wherein the first fiber management and connection panel assembly and the second fiber management and connection panel assembly are positioned on either side of the storage bay so that the storage bay is sandwiched therebetween.

13. A fiber optic closure comprising:

a first fiber management and connection panel assembly positioned within the closure and configured to establish at least one sleeve connection between a first pair of opposing fiber optic connectors and to split a signal from an input optical fiber into a plurality of output optical fibers, the first fiber management and connection panel assembly defining a first plane with the first pair of fiber optic connectors parallel to the first plane; and a second fiber management and connection panel assembly positioned within the closure and configured to establish at least one sleeve connection between a second pair of opposing fiber optic connectors and to split a signal from an input optical fiber into a plurality of output optical fibers, the second fiber management and connection panel assembly defining a second plane parallel to the first plane with the second pair of fiber optic connectors parallel to the second plane;

wherein the first fiber management and connection panel assembly and the second fiber management and connection panel assembly are spaced apart and define a storage bay therebetween for retaining and organizing a length of slack fiber optic cable, the storage bay defining a third plane parallel to the first plane and the second plane.

14. The fiber optic closure of claim 13 wherein the first fiber management and connection panel assembly and the second fiber management and connection panel assembly each comprises a coupler cassette subassembly having at least one coupler cassette for splitting the signal from the input optical fiber into the plurality of output optical fibers.

15. The fiber optic closure of claim 13 wherein at least one of the first fiber management and connection panel assembly and the second fiber management and connection panel assembly is movable relative to the storage bay to provide access to the length of slack fiber optic cable.

* * * * *

UNITED STATES PATENT AND TRADEMARK OFFICE
CERTIFICATE OF CORRECTION

PATENT NO. : 6,539,160 B2
DATED : March 25, 2003
INVENTOR(S) : Jennifer A. Battey, Steve A. Fontaine and James M. Carlson It is certified that error appears in the above-identified patent and that said Letters Patent is hereby corrected as shown below:

Column 7,
Line 36, after "panel" insert -- ; and --.

Column 8,
Line 3, after "platform" insert -- ; --.

Signed and Sealed this

Thirtieth Day of December, 2003

JAMES E. ROGAN
*Director of the United States Patent and Trademark Office*